United States Patent [19]
Tewksbury

[11] 3,815,033

[45] June 4, 1974

[54] DISCRETE ADAPTIVE DELTA MODULATION SYSTEM

[75] Inventor: Stuart Keene Tewksbury, Middletown, N.J.

[73] Assignee: Bell Telephone Laboratories, Incorporated, Murray Hill, N.J.

[22] Filed: June 1, 1972

[21] Appl. No.: 258,529

Related U.S. Application Data

[63] Continuation-in-part of Ser. No. 94,458, Dec. 2, 1970, Pat. No. 3,706,944.

[52] U.S. Cl. ............... 329/104, 325/38 B, 328/151, 332/11 D

[51] Int. Cl. ............... H03k 13/22

[58] Field of Search ............... 332/11 D; 329/104; 328/151; 325/38 A, 38 B

[56] References Cited

UNITED STATES PATENTS

| | | | |
|---|---|---|---|
| 3,350,643 | 10/1967 | Webb | 328/151 X |
| 3,453,582 | 7/1969 | Magnuski | 325/38 B X |
| 3,497,624 | 2/1970 | Brolin | 325/38 B X |
| 3,582,784 | 6/1971 | Gaunt | 329/104 X |
| 3,646,442 | 2/1972 | Kotch | 328/38 B |
| 3,710,267 | 1/1973 | Fawcett | 328/151 |

OTHER PUBLICATIONS

Deutsch et al., "Digital Filter for Delta Demodulator", IBM Tech. Disclosure Bulletin, Vol. 10, No. 4, p. 370 Sept. 1967.

*Primary Examiner*—Alfred L. Brody
*Attorney, Agent, or Firm*—C. E. Graves

[57] ABSTRACT

In a discrete adaptive delta modulation system, the modulator located at the transmitter converts an analog signal into a digital signal at the rate $f_s$ while the demodulator located at the receiver converts the digital signal back into the analog signal. The modulator and demodulator each comprise a programmable pulse generator operating at the rate $f_t$ for providing a controlled number of pulses $k$ during each sampling period $1/f_s$ to its associated single stepsize analog integrator. The modulator further comprises a comparator, a quantizer, and a sampling pulse generator operating at the rate $f_s$ while the demodulator further comprises a low-pass filter in series with the integrator. The number of pulses $k$ provided by the programmable pulse generator multiplied by the integrator basic stepsize $\sigma_o$ determines the overall stepsize $\sigma_k$ in the integrator output signal, where $k = f_t/f_s$. A feature of this system is that the number $n$ of available stepsizes $\sigma_k$, which is a function of the ratio of generator rates $f_t$ and $f_s$, can be several hundred without affecting the complexity of the integrating circuitry.

13 Claims, 11 Drawing Figures

DISCRETE ADAPTIVE DELTA MODULATION SYSTEM

RELATED APPLICATION

This application is a continuation-in-part of copending application, Ser. No. 94,458, filed Dec. 2, 1970, now U.S. Pat. No. 3,706,944.

FIELD OF THE INVENTION

This invention relates to digital data transmission systems and in particular to a discrete adaptive delta modulation system.

BACKGROUND OF THE INVENTION

One conventional single stepsize nonadaptive delta modulation system includes a delta modulator (DM) located at the transmitter and an associated delta demodulator (DD) located at the receiver. At the DM, the analog input signal to be encoded and transmitted is sampled at the constant rate $f_s$ to yield a sequence of digital output pulses. These digital pulses are transmitted to the DD and are also fed back to an integrator whose output increases or decreases in discrete single-valued steps $\sigma_o$. Finally, both the integrator output signal and the analog input signal are applied to a comparator whose output is sampled as above. At the DD, the received digital pulses are applied to the serial combination including an integrator and a low-pass filter to yield the reconstructed analog signal.

Because the steps are single valued, one of the inherent drawbacks of the conventional single stepsize nonadaptive delta modulation system is an inability to follow an analog input signal whose change in amplitude from one sampling period to the next exceeds the basic stepsize $\sigma_o$ of the system. This inability to follow a rapidly varying analog input signal results in slope overload distortion. The problem of slope overload distortion cannot be satisfactorily corrected by merely increasing the basic stepsize, since then an increase in quantizing noise would result at the smaller analog input signal amplitudes. Therefore, in spite of its simple circuit structure, this nonadaptive system retains the disadvantage of requiring a high sampling rate which in turn necessitates a large channel bandwidth.

The conventional discrete adaptive delta modulation system includes a delta modulator (DADM) located at the transmitter and an associated delta modulator (DADD) located at the receiver. The DADM overcomes the limitations of the nonadaptive DM by responding automatically to analog input signal parameters. The DADM monitors the digital output signal and in response thereto changes the stepsize $\sigma_k$ of the integrator and hence the amplitude of the feedback signal. Therefore, a slope in the analog input signal greater than $\sigma_O f_s$, where $\sigma_O$ is the feedback integrator basic stepsize and $f_s$ is the sampling rate, forces the circuit into slope overload whereupon the stepsize $\sigma_k$ is continually increased until the feedback signal attains the analog input signal amplitude or until the maximum stepsize $\sigma_n$ is reached. Generally, once the feedback signal attains the analog input level, the feedback signal oscillates about this input level while the stepsize $\sigma_k$ continually decreases to the basic stepsize $\sigma_O$. The DADD monitors the received digital signal and in response thereto changes the stepsize $\sigma_k$ of its integrator and hence the amplitude of the integrator output signal. Finally, the integrator output signal is applied to a lowpass filter to yield the reconstructed analog signal.

Although the conventional discrete adaptive delta modulation system substantially eliminates problems of slope overload and the requirement of a high sampling rate, the need remains for complex analog circuitry which is difficult to implement in integrated circuit form and which requires a plurality of precise adjustments. In other words, this adaptive system requires tight tolerance control to insure that the various stepsizes $\sigma_o \ldots \sigma_k \ldots \sigma_n$ are in the correct ratios.

It is therefore an object of this invention to provide a new and improved discrete adaptive delta modulation system.

It is another object of this invention to provide a simple, flexible, and economical variable stepsize delta modulation system.

It is a further object of this invention to provide a discrete adaptive delta modulation system which does not require complex analog circuitry.

It is a still further object of this invention to provide a discrete adaptive delta modulation system requiring adjustments in digital components rather than in analog components.

It is yet another object of this invention to provide in a delta modulation system a single device having the simplicity of a conventional nonadaptive delta modulation system which can be used to produce variable sampling rate and variable stepsize adaptability.

It is an additional object of this invention to provide a universal single stepsize nonadaptive delta modulation circuit which can be realized in integrated circuit form and can be easily utilized in a discrete adaptive delta modulation system with the addition of external digital logic.

SUMMARY OF THE INVENTION

According to the present invention, the modulator (DADM) and the associated demodulator (DADD) of a discrete adaptive delta modulation system each comprise a programmable pulse generator operating at the rate $f_t$ and a single stepsize analog integrator for producing stepsizes $\sigma_k$ in the integrator output which are integral composites of the integrator basic stepsize $\sigma_O$, as determined by the ratio of the programmable pulse generator and delta modulated digital signal rates $f_t$ and $f_s$, respectively.

According to a first illustrative embodiment of the invention, a DADM and its associated DADD each comprise a flip-flop, a sampling pulse generator operating at the rate $f_s$, a first and second logic gates, a charge parcelling integrator, adaption logic, a counter, a pulse rate selector operating at the rate $f_t$, and a high rate clock source operating at the rate $f_{t\ max}$. The adaption logic, which at the DADM responds to the digital output signal while at the DADD responds to the received or, if necessary, the retimed digital signal, controls the count of the associated counter. The counter then determines which subfrequency $f_t$ of the high rate clock source is emitted by the pulse rate selector. The logic gates, which are jointly responsive to the pulse rate selector output at the rate $f_t$ and the complementary outputs of the flip-flop at the rate $f_s$, provide an integral number of pulses given by the ratio $k = f_t/f_s$ to the associated charge parcelling integrator during the sampling period $1/f_s$. At the DADM, the charge parcelling integrator output, which is the feedback signal, and the analog input signal are applied to a comparator. The comparator output and the sampling pulse generator output at the rate $f_s$ drive the complementary inputs of the associated flip-flop. At the DADD, however, the charge parcelling integrator output is applied to a low-pass filter to yield the reconstructed analog signal. It is apparent that the stepsize $\sigma_k$ in each integrator output signal is determined by the product of the integrator basic stepsize $\sigma_0$ and the integral number of pulses $k$ provided by the associated logic gates.

According to a second illustrative embodiment of the invention, a DADM and its associated DADD each comprise a quantizer, a single stepsize analog integrator, a variable sampling pulse generator operating at the rate $f_s$, and a programmable pulse generator operating at the rate $f_t$. The sampling and programmable pulse generators individually comprise adaption logic, a counter, a pulse rate selector, and high rate clock sources operating at the rates $f_{s\ max}$ and $f_{t\ max}$, respectively. The adaption logic circuits, which at both the DADM and the DADD respond to their associated quantizer, determine which subfrequencies $f_s$ and $f_t$ are emitted by their respective pulse rate selectors. Each integrator is jointly responsive to its associated pulse rate selector operating at the rate $f_t$ and to its associated quantizer operating at the rate $f_s$, thereby receiving an integral number of pulses given by the ratio $k = f_t/f_s$ during the sampling period $1/f_s$. At the DADM, the integrator output, which is the feedback signal, and the analog input signal are then applied to a comparator. The comparator output and the pulse rate selector output at the rate $f_s$ drive the associated quantizer. At the DADD, however, the integrator output is applied to a lowpass filter to yield the reconstructed analog signal. It is apparent that the stepsize $\sigma_k$ in each integrator output signal is determined by the product of the integrator basic stepsize $\sigma_0$ and the integral number of pulses $k$ provided by the associated pulse rate selector operating at the rate $f_t$.

It is therefore an advantage of this invention that it provides the characteristics of a complex discrete adaptive delta modulation system while keeping the simple circuit structure of a conventional nonadaptive delta modulation system.

It is another advantage of this invention that it is readily realized in integrated circuit form since many former analog functions are now performed digitally.

It is a further advantage of this invention that it requires a single stepsize analog integrator rather than a complex integrator.

It is a still further advantage of this invention that it requires a relatively low sampling rate and therefore a low transmission channel bandwidth.

It is a feature of this invention that the step sizes and the number of distinct stepsizes can easily be changed by modifying a programmable pulse generator.

It is another feature of this invention that the stepsize and the sampling rate can be varied in accordance with any characteristic of either the analog input signal or the delta-modulated digital signal.

It is a further feature of this invention that the single stepsize analog integrator is pulsed at a rate greater than or equal to the sampling rate.

It is a still further feature of this invention that the various stepsizes are automatically precise.

It is yet another feature of this invention that the number of distinct stepsizes is determined by the ratio of the integrator pulsing rate and the sampling rate.

DESCRIPTION OF THE DRAWING

The above and other objects, features and advantages of this invention will be better appreciated by a consideration of the following detailed description and the drawing in which.

DETAILED DESCRIPTION

Figure 1A:
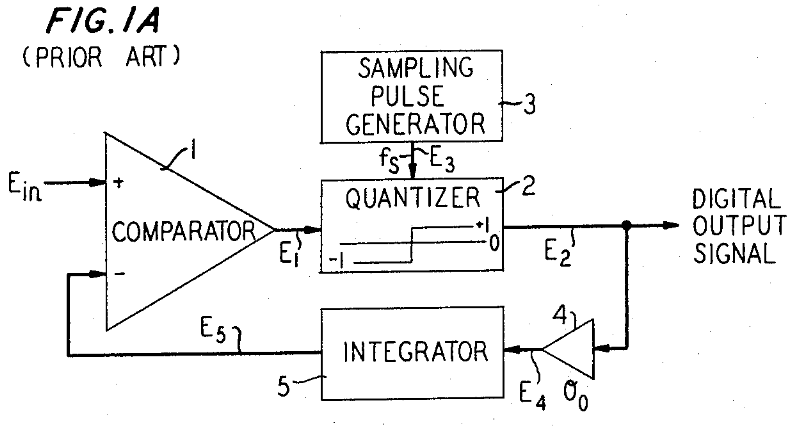
FIG. 1A (PRIOR ART)
FIG. 1A is a block diagram representation of a conventional single stepsize nonadaptive delta modulator (DM) and FIG. 1B shows the analog input signal and the corresponding feedback signal.

FIG. 1A is a block diagram representation of a single stepsize nonadaptive delta modulator (DM) according to the prior art comprising comparator 1, quantizer 2, sampling pulse generator 3 operating at the constant rate $f_s$, gain device 4, and feedback integrator 5. The combination comprising gain device 4 and integrator 5 can be considered a single stepsize analog integrator. For illustrative purposes it is assumed that the analog input signal is the smooth waveform $E_{in}$ of FIG. 1B. Sampling pulse generator 3 emits pulses at the rate $f_s$ to quantizer 2 which, in turn, emits a positive or negative unit pulse for each pulse from generator 3. Digital output signal $E_2$ of quantizer 2 is amplified by the fixed amount $\sigma_0$ in gain device 4. Amplified signal $E_4$ is then applied to integrator 5 which has its output $E_5$ coupled to the negative input terminal of comparator 1. Comparator 1 compares analog input signal $E_{in}$ appearing at its positive input terminal with feedback signal $E_5$ to provide difference signal $E_1$ whose polarity is determined by the sense of the difference $E_{in} - E_5$. Output $E_1$ of comparator 1 is then applied to quantizer 2 which during each sampling period $1/f_s$ emits a positive unit pulse when difference signal $E_1$ is positive and a negative unit pulse when difference signal $E_1$ is negative. Therefore, comparator 1 determines at each sampling instant, that is, whenever generator 3 emits a sampling pulse, whether the unit pulse emitted by quantizer 2 is positive or negative, such determination being dependent upon feedback signal $E_5$. Therefore, sampling of analog input signal $E_{in}$ occurs at periodic intervals which are determined by the pulses from generator 3.

Figure 1B:
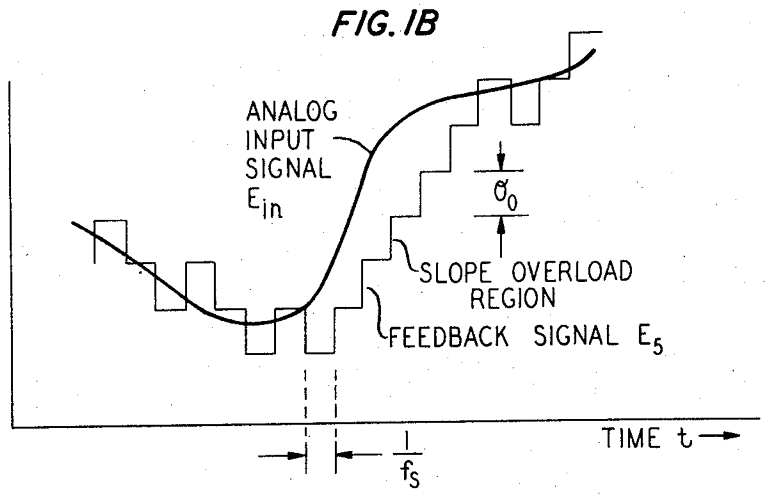

FIG. 1B shows analog input signal $E_{in}$ and corresponding feedback signal $E_5$. In accordance with the above description, for each positive unit pulse emitted by quantizer 2, output $E_5$ of integrator 5 rises by one step $\sigma_O$ whereas for each negative unit pulse emitted by quantizer 2, output $E_5$ decreases by one step $\sigma_O$. Output $E_5$ therefore is a stepped waveform which changes by only one step $\sigma_O$ each sampling period.

In the circuit of FIG. 1A, digital output signal $E_2$ merely indicates the direction of change of analog input signal $E_{in}$ at each sampling instant rather than the actual magnitude of the change. Since feedback signal $E_5$ can change only one step $\sigma_o$ per sampling pulse, the feedback signal cannot closely follow analog input signal $E_{in}$ when $E_{in}$ changes rapidly. The largest slop $|E'_{in}(t)|$ that this conventional nonadaptive DM can reproduce is one changing by one step $\sigma_O$ every sampling period. In other words, the slope capability of this DM is $\sigma_O f_s$, where $\sigma_O$ is the integrator basic stepsize and $f_s$ is the sampling rate of generator 3, and this slope capability must be greater than or equal to $|E'_{in}(t)|$, which represents the absolute value of the derivative of analog input signal $E_{in}$ with respect to time. An example of slope overload is shown in FIG. 1B. A serious disadvantage of conventional nonadaptive DM is thus the inability to follow rapidly changing analog input signals.

A well-known practice of the prior art is to delete transmission of the negative unit pulses without affecting the logical design of the receiver.

In conventional manner, the single stepsize nonadaptive delta demodulator (DD) associated with the DM of FIG. 1A comprises the serial combination of a gain device, an integrator and a low-pass filter. Again, the combination comprising the gain device and the integrator can be considered a single stepsize analog integrator, being similar to that at the DM. In this DD, the received digital signal is amplified by the fixed amount $\sigma_O$ in the gain device. The amplified digital signal is then applied to the integrator whose output, in turn, is applied to the low-pass filter. Finally, the low-pass filter provides the reconstructed analog signal.

Figure 2B:
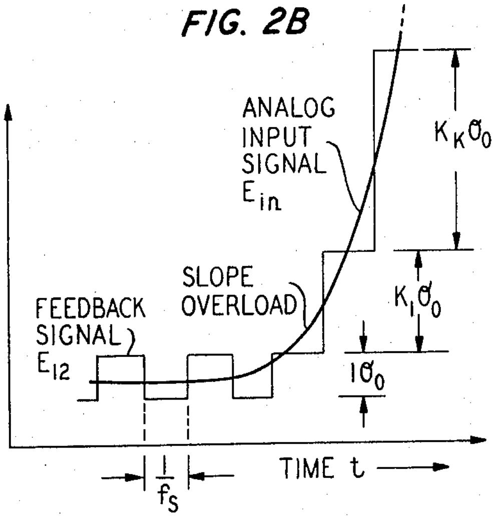
FIG. 2A is a block diagram representation of a conventional discrete adaptive delta modulator (DADM) and FIG. 2B shows the analog input signal and the corresponding feedback signal.
Figure 2A:
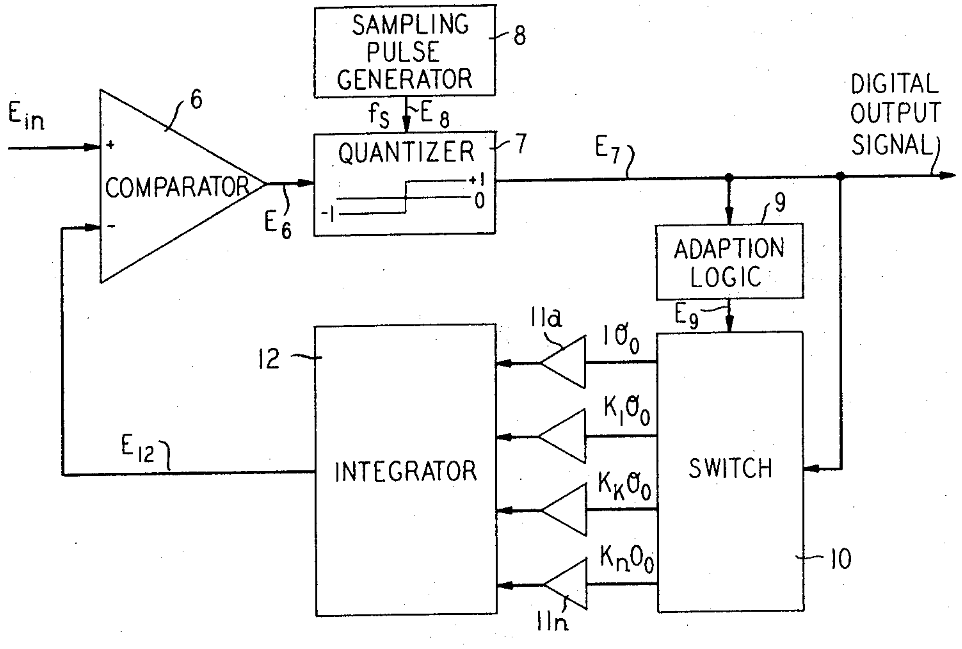
FIG. 2A (PRIOR ART)

FIG. 2A is a block diagram representation of a discrete adaptive delta modulator (DADM) of the prior art comprising comparator 6, quantizer 7, sampling pulse generator 8 operating at the constant rate $f_s$, adaption logic 9, switch 10, gain devices $\mathbf{11}_a \ldots \mathbf{11}_n$, and feedback integrator 12. While comparator 6, quantizer 7, and sampling pulse generator 8 function in the same manner as the respective elements of FIG. 1A, the present circuit comprises variable stepsize analog feedback circuitry rather than single stepsize analog feedback circuitry. In this circuit, adaption logic 9 responds to digital output signal $E_7$ for controlling switch 10. Switch 10 then applies the digital output signal to an appropriate gain device $\mathbf{11}_k$ for amplification by the factor $K_k\sigma_O$. The output of gain device $\mathbf{11}_k$ is applied to integrator 12 as the stepsize $K_k\sigma_O$, since the digital output signal consists of positive and negative unit pulses. Finally, the output of integrator 12 is applied to the negative input terminal of comparator 6. In other words, this circuit has an adaptive slope capability given by $K_k\sigma_O f_s$, where $K_k\sigma_O$ is the particular gain factor chosen by switch 10, $\sigma_O$ is the basic stepsize associated with the feedback circuitry, and $f_s$ is the sampling rate of generator 8. Generally $\sigma_O$ and $f_s$ are constant. Adaption logic of the type described herein is well known in the prior art.

In the DADM of FIG. 2A, switch 10 chooses, in effect, a gain $K_k\sigma_O$ by which to multiply digital output signal $E_7$. This choice of gain is made by adaption logic 9 and is based on observations of sequences of positive and negative unit pulses making up digital output signal $E_7$. For example, when there is initial slope overload as shown in FIG. 2B, digital output signal $E_7$ is a sequence of positive unit pulses. In response to this sequence of positive unit pulses, switch 10 selects a gain $K_1\sigma_O$ greater than $1\sigma_O$ such that the new larger stepsize is $K_1\sigma_O$. If digital output signal $E_7$ continues to be made up of positive unit pulses, the stepsize is incrementally increased at the sampling rate of $f_s$ to $K_2\sigma_O$, $K_3\sigma_O$, etc., until the largest value $K_n\sigma_O$ is reached. The stepsize incrementally decreases when the polarity of the output pulses reverses.

It can therefore be seen that slope overload is not a controlling degradation until $|E'_{in}(t)|$ is greater than the maximum slope capability of the system, which is given by $K_n\sigma_O f_s$.

The discrete adaptive delta modulator (DADD) associated with the DADM of FIG. 2A comprises a quantizer, a sampling pulse generator operating at the constant rate $f_s$, adaption logic, a switch, a plurality of gain devices, an integrator, and a low-pass filter. These elements, except for the low-pass filter, are substantially the same and operate in substantially the same manner as the corresponding elements of the associated DADM of FIG. 2A. Again, the low-pass filter provides the reconstructed analog signal.

In spite of its adaptive capability, the conventional discrete adaptive delta modulation system requires complex analog circuitry as exemplified by the switches and their associated gain devices. Also, in order to change the available stepsizes $\sigma_k = K_k\sigma_O$, all $K_k$ must be precisely adjusted thereby requiring close tolerance control, even though a common source for $\sigma_O$ may be utilized. Finally, in this conventional adaptive system, it has been determined that the number of available stepsizes $n$ is limited by the complexity of the analog circuitry.

Figure 3A:
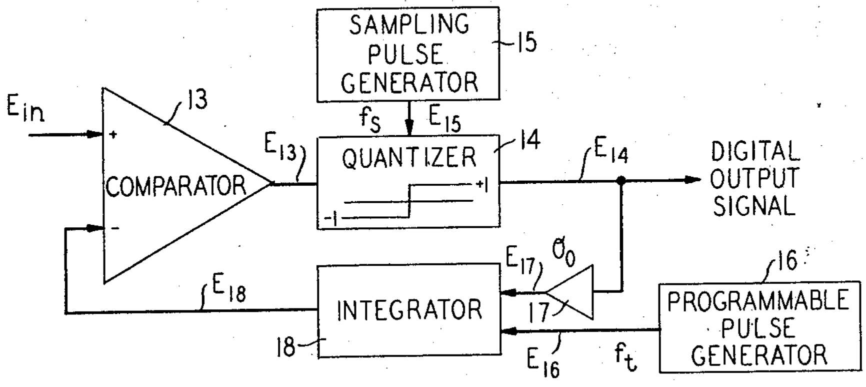
FIG. 3A is a block diagram representation of a DADM according to the present invention and FIG. 3B shows the analog input signal and the corresponding feedback signal.

FIG. 3A is a block diagram representation of a DADM according to the present invention comprising comparator 13, quantizer 14, sampling pulse generator 15 operating at the rate $f_s$, programmable pulse generator 16 operating at the rate $f_t$, gain device 17, and integrator 18. Several components of this circuit are substantially the same and operate in substantially the same manner as do corresponding components of the conventional nonadaptive DM of FIG. 1A and the conventional DADM of FIG. 2A except that feedback integrator 18 is pulsed by programmable pulse generator 16 at a rate other than the sampling rate $f_s$. The rate at which integrator 18 is pulsed is called the toggle rate $f_t$.

It will be recalled that quantizer 2 of FIG. 1A provides digital output signal $E_2$ to integrator 5 at a constant rate $f_s$ which is determined by sampling pulse generator 3. Accordingly, the output of integrator 5 changes by the basic stepsize $\sigma_O$ only once during each sampling period $1/f_s$. However, in the circuit of FIG. 3A, even though quantizer 14 provides digital output signal $E_{14}$ to integrator 18 at the sampling rate $f_s$, the output of integrator 18, which is feedback signal $E_{18}$, changes by the basic stepsize $\sigma_O$ an integral number of times $k$ during each sampling period $1/f_s$, where $k = f_t/f_s$.

Figure 3B:
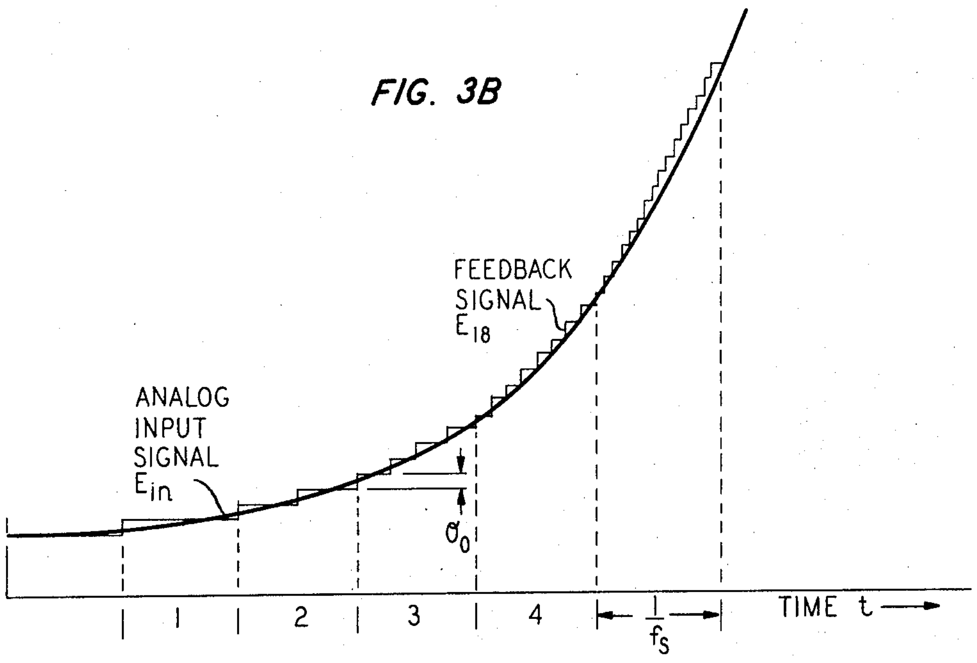

For purposes of explanation, suppose that the sampling rate $f_s = 50$ KHz and that the toggle rate $f_t$ is such that $f_s \leq f_t \leq f_{t\,max} = 12.8$ MHz. If $\lambda = f_{t\,max}/f_s$, then $\lambda$ equals 256. Therefore the number $k$ of clock pulses from programmable pulse generator 16 that can be applied to integrator 18 during any sampling period $1/f_s$ ranges from 1 to 256. In FIG. 3B, which shows feedback signal $E_{18}$, it can readily be seen that integrator 18 was pulsed positively once during interval 1, twice during interval 2, four times during interval 3, and eight times during interval 4. Therefore, in this case, the step increases in the feedback signal during intervals 1 through 4 are binarily weighted at $1\sigma_O$, $2\sigma_O$, $4\sigma_O$ and $8\sigma_O$, respectively. In effect, 256 possible stepsizes $\sigma_k$ are available in the present DADM compared to a much smaller number available in the conventional DADM. The number of pulses which can be applied to integrator 18 during any sampling period $1/f_s$ by programmable pulse generator 16 can be made dependent upon digital output signal $E_{14}$ and the particular circuitry utilized to follow $E_{14}$.

It should be noted that programmable pulse generator 16 of FIG. 3A can be shared simultaneously by several DADMs to provide the correct number of pulses to the respective feedback integrators. Simple gating circuitry, responsive to the respective digital output signals, could be utilized. This, to some extent, would reduce per-channel complexity.

Figure 6:
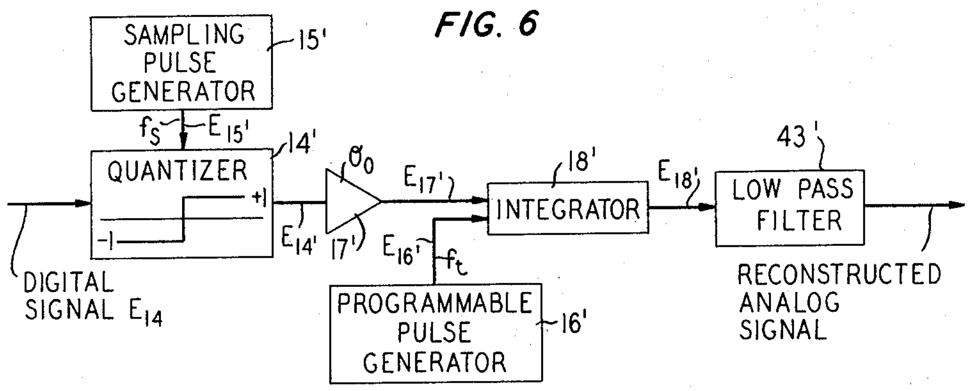
FIGS. 6, 7 and 8 are diagrams of discrete adaptive delta demodulators (DADDs) according to the present invention which are respectively associated with the DADMs of FIGS. 3A, 4 and 5.

FIG. 6 is a diagram of a DADD according to the present invention which is associated with the DADM of FIG. 3A. This DADD comprises quantizer 14', sampling pulse generator 15' operating at the rate $f_s$, programmable pulse generator 16' operating at the rate $f_t$, gain device 17', integrator 18' and low-pass filter 43'. These elements, except for low-pass filter 43', are substantially the same and operate in substantially the same manner as the corresponding elements of the associated DADM of FIG. 3A. Again, low-pass filter 43' provides the reconstructed analog signal. It should be noted herein, however, that in this case the combination comprising quantizer 14' and sampling pulse generator 15' functions merely to retime incoming digital signal $E_{14}$ rather than to digitize an incoming analog signal. Therefore, if the synchronization errors in the received digital signal are not overly severe, then the combination comprising quantizer 14' and sampling pulse generator 15' can be eliminated, in which case received digital signal $E_{14}$ would then be directly applied to gain device 17'. It should be noted that the output of integrator 18' includes the analog signal plus noise components resulting from quantization and sampling. It is to get rid of these noise components that low-pass filter 43' is utilized. However, in those cases where these noise components are not too severe, then low-pass filter 43' can also be eliminated.

Figure 4:
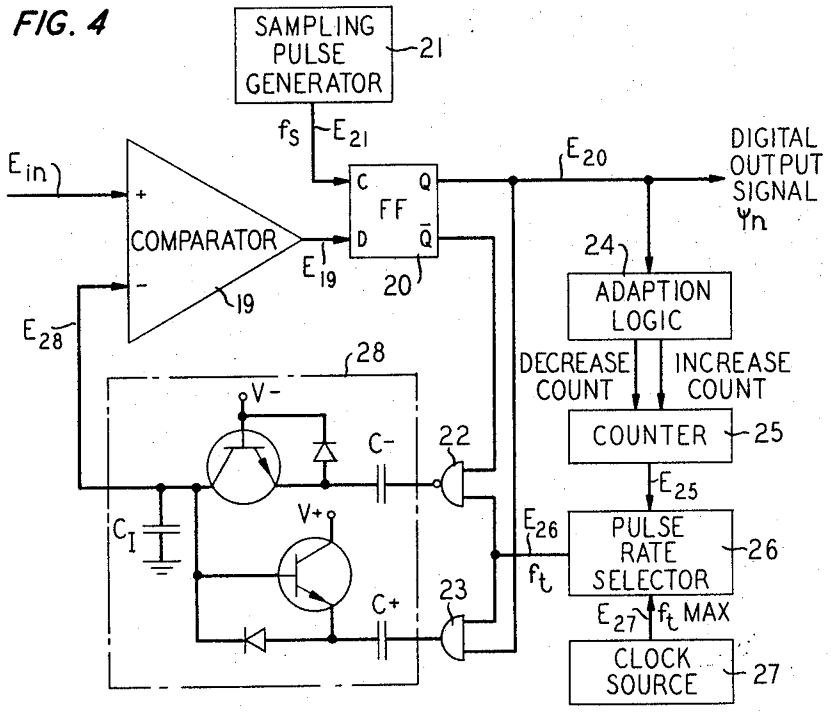
FIG. 4 is a detailed diagram of a first illustrative embodiment of a DADM according to the present invention.

FIG. 4 is a detailed diagram of a first illustrative embodiment of a DADM according the present invention. Flip-flop 20 corresponds to quantizer 14. Gates 22 and 23 and integrator 28, in combination, correspond to integrator 18 and gain device 17. Also, adaption logic 24, counter 25, pulse rate selector 26 operating at the rate $f_t$, and clock source 27 operating at the rate $f_{t\,max}$, in combination, correspond to programmable pulse generator 16. Flip-flop 20 performs the sampling function while gates 22 and 23 drive feedback integrator 28. It can readily be seen that gates 22 and 23 are not driven exclusively by the output of sampling pulse generator 21 by way of flip-flop 20. Comparator 19 provides difference signal $E_{in} - E_{28}$ which, in turn, is sampled by flip-flop 20 to give digital output signal $e_{20}$, a sequence of positive and negative unit pulses designated $\psi_n$.

Gate 23 provides a positive unit pulse to integrator 28 when $\psi_n = +1$ whereas gate 22 provides a negative unit pulse to integrator 28 when $\psi_n = -1$. This integration technique, which results in the application of a quantum of charge to integrating capacitor $C_I$, is known as charge parcelling integration and is described fully in copending application Ser. No. 190,400 filed on Oct. 18, 1971, by R. R. Laane and B. T. Murphy, this copending application being a continuation under Patent Office Rule 60 of prior application Ser. No. 884,058, filed on Dec. 11, 1969, and now abandoned. In effect, when $\psi_n = +1$ or $-1$, a controlled amount of charge independent of $E_{28}$ is added to or subtracted from integrating capacitor $C_I$. The charge transfer is completed within a few nanoseconds. Therefore, the change in $E_{28}$ is independent of the widths of the pulses from gates 22 and 23. Use of the charge parcelling integration technique avoids stepsize variations due to timing fluctuations in the circuitry. Feedback signal $E_{28}$ has the staircase appearance shown in FIG. 3B.

Recall that flip-flop 20 samples comparator output signal $E_{19}$ to yield digital output signal $E_{20}$ represented by sequence $\psi_n$. If analog input signal $E_{in}$ has a slope greater than $|\sigma_O f_s|$, where $\sigma_O$ is the basic stepsize and $ff_s$ is the sampling rate of generator 21, sequence $\psi_n$ then satisfies the following: $\psi_n = \psi_{n-1} = \psi_{n-2} = \psi_{n-3} = \ldots$ (Sequence A). Such a pattern of $\psi_n$ denotes the occurrence of slope overload and the length of overall Sequence A can be made to provide a measure of the slope overload severity. If, however, analog input signal $E_{in}$ changes at a very low rate, then sequence $\psi_n$ tends to alternate and satisfies the following: $\psi_n = -\psi_{n-1} = \psi_{n-2} = -\psi_{n-3} = \ldots$ (Sequence B).

Therefore, in the DADM of FIG. 4, adaption logic 24 recognizes Sequences A and B and upon detection of either one respectively increases or decreases the count of counter 25. Adaption logic 24 is well known in the prior art as was stated with reference to FIG. 2A. Recall that adaption logic 9 of FIG. 2A responds to digital output signal $E_7$ to control the selection of a stepsize $K_k\sigma_O$ by switch 10. However, adaption logic 24 responds to digital output signal $E_{20}$ to control the count of counter 25. The counter output is then used to select the number of pulses from clock source 27 operating at the rate $f_{t\,max}$ that are to be emitted by pulse rate selector 26 at the rate $f_t$ during the sampling period $1/f_s$. Adaption logic 24 therefore indicates to counter 25 what the next stepsize $\sigma_k$ should be, i.e., the number of pulses $k$ that are to be applied to integrator 28 via gates 22 and 23 by pulse rate selector 26.

Gates 22 and 23 respond to the output of pulse rate selector 26 and cause integrator 28 to continually charge, discharge, or alternately charge and discharge an integral number of times during each sampling period $1/f_s$ according to the occurrence of either Sequence A or B. Therefore, the DADM of FIG. 4 can track rapidly varying analog input signals, yet still provides high resolution encoding of slowly varying analog input signals. Also, the number $n$ and values of distinct stepsizes $\sigma_k$ can usually be modified without changes in comparator 19, flip-flop 20, gates 22 and 23, and integrator 28.

Figure 7:
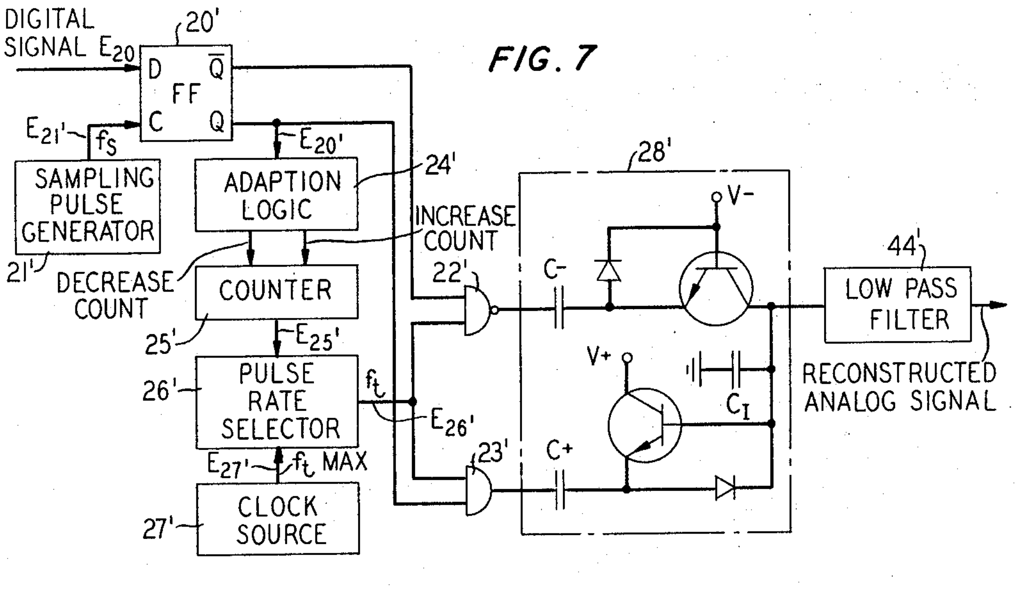

FIG. 7 is a diagram of a DADD according to the present invention which is associated with the DADM of FIG. 4. This DADD comprises flip-flop 20', sampling pulse generator 21' operating at the rate $f_s$, gates 22' and 23', adaption logic 24', counter 25', pulse rate selector 26' operating at the rate $f_t$, clock source 27' operating at the rate $f_{t\ max}$, integrator 28', and low-pass filter 44'. Again, these elements, except for low-pass filter 44', are substantially the same and operate in substantially the same manner as the corresponding elements of the associated DADM of FIG. 4. In this case low-pass filter 44' provides the reconstructed analog signal. Also, the combination comprising flip-flop 20' and sampling pulse generator 21' functions merely to retime received digital signal $E_{20}$. Therefore, in certain cases, these two elements can be eliminated without adversely affecting the overall operation of the DADD. Finally, low-pass filter 44' can also be eliminated, under certain conditions, as previously mentioned.

The circuits of FIGS. 4 and 7 can be practiced in several ways depending upon individual needs. For instance, in order to reduce synchronization problems between each sampling pulse generator and its associated pulse rate selector, the output of each clock source at the rate $f_{t\ max}$ can be divided in a frequency divider circuit having an appropriate divisor to yield the sampline rate $f_s$. Therefore, separate sampling pulse generators would not be necessary. In the alternative, the output of each sampling pulse generator at the rate $f_s$ can be multiplied in a frequency multiplication circuit having an appropriate multiplication factor to yield the clock rate $f_{t\ max}$. In such a case, a separate clock source would not be necessary. Also, each pulse rate selector could be a binary rate multiplier in which case the number $k$ of clock pulses provided thereby during any sampling period $1/f_s$ could be any number from 1 to $\lambda = f_{t\ max}/f_s$, where $f_{t\ max}$ is the operating rate of the associated clock source. Generally, $f_{t\ max}$ is determined by the maximum toggle rate of the associated integrator. Therefore, the possible stepsizes would be $\sigma_k = k\sigma_o$, where $1 \leq k \leq \lambda$. Binary rate multipliers, as mentioned before, are well known in the prior art. In addition, each counter can be a binary counter such that the number $k$ of clock pulses provided by the associated pulse rate selector during any sampling period $1/f_s$ occurs in powers of 2 up to $f_{t\ max}$. Therefore, the possible stepsizes are $\sigma_k = 2^k\sigma_o$, where $o \leq k \leq \log_2\lambda$. Whenever the latter series of stepsizes is used there results exponential adaption. Finally, although not generally used, a zero stepsize O $\sigma_0$ could be included in either of the above sets $\sigma_k$ in order to reduce idle channel quantizing noise.

Figure 5:
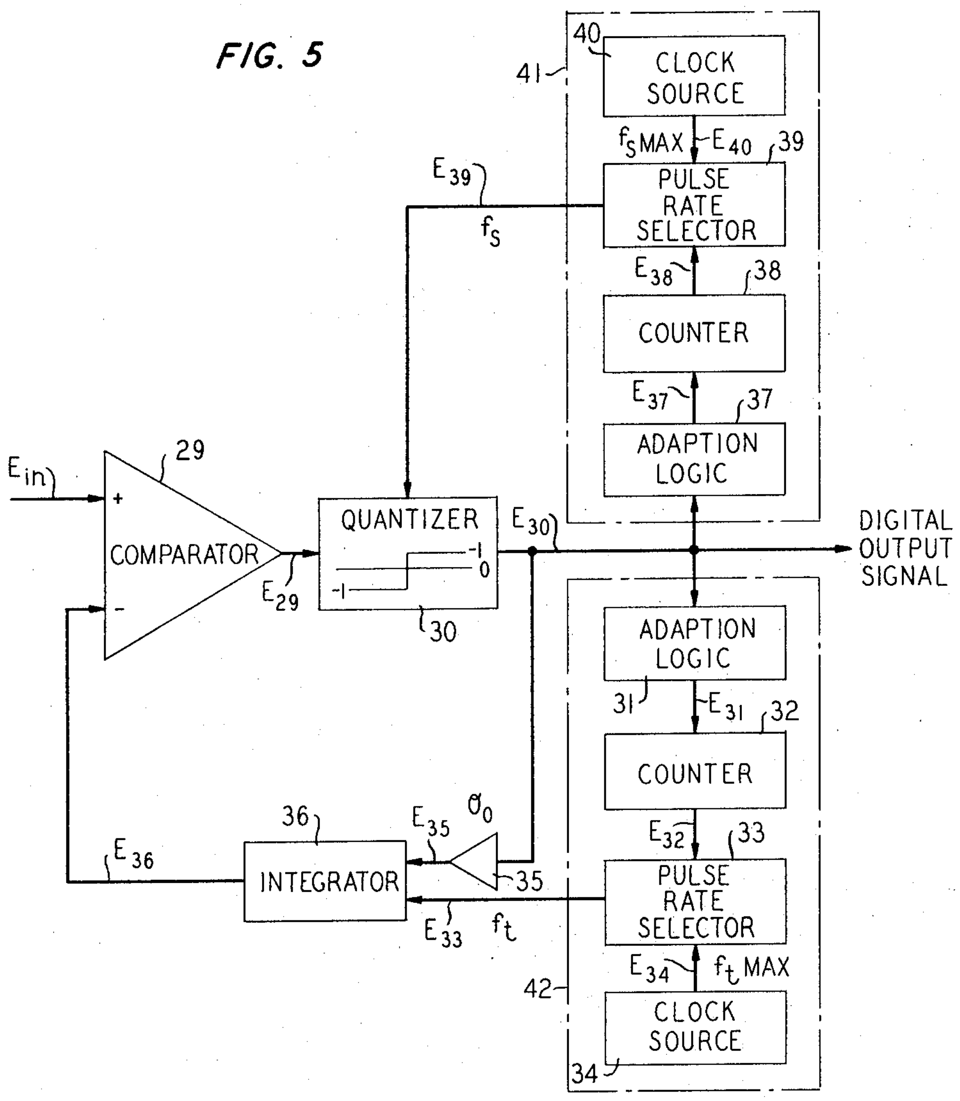
FIG. 5 is a block diagram representation of a second illustrative embodiment of a DADM having a variable sampling rate according to the present invention.

FIG. 5 is a block diagram representation of a second illustrative embodiment of a DADM according to the present invention comprising comparator 29, quantizer 30, gain device 35, integrator 36, sampling pulse generator 41 operating at the rate $f_s$, and programmable pulse generator 42 operating at the rate $f_t$. This circuit is similar to that of FIG. 4 except that the effective sampling pulse rate, as well as the toggling pulse rate, is made adaptive. Thus, clock source 40 operating at the rate $f_{s\ max}$ provides pulses to pulse rate selector 39 rather than directly to quantizer 30. The integral number of pulses emitted by pulse rate selector 39 at the rate $f_s$ is then controlled by adaption logic 37 and counter 38 which respond to digital output signal $E_{30}$ in a manner similar to that already described. Therefore, this circuit can be referred to as a DADM with an adaptive sampler clock since the rate $f_s$ at which pulse rate selector 39 operates is determined by the digital output signal. It should be noted that most conventional DM circuits operate at a constant sampling rate $f_s$ while in this case the sampling rate varies. It is apparent that quantizer 30 could comprise flip-flop 20 while gain device 35 and integrator 36 could comprise gates 22 and 23 and charge parcelling integrator 28. Finally, pulse rate selector 39 could comprise a binary rate multiplier.

Figure 8:
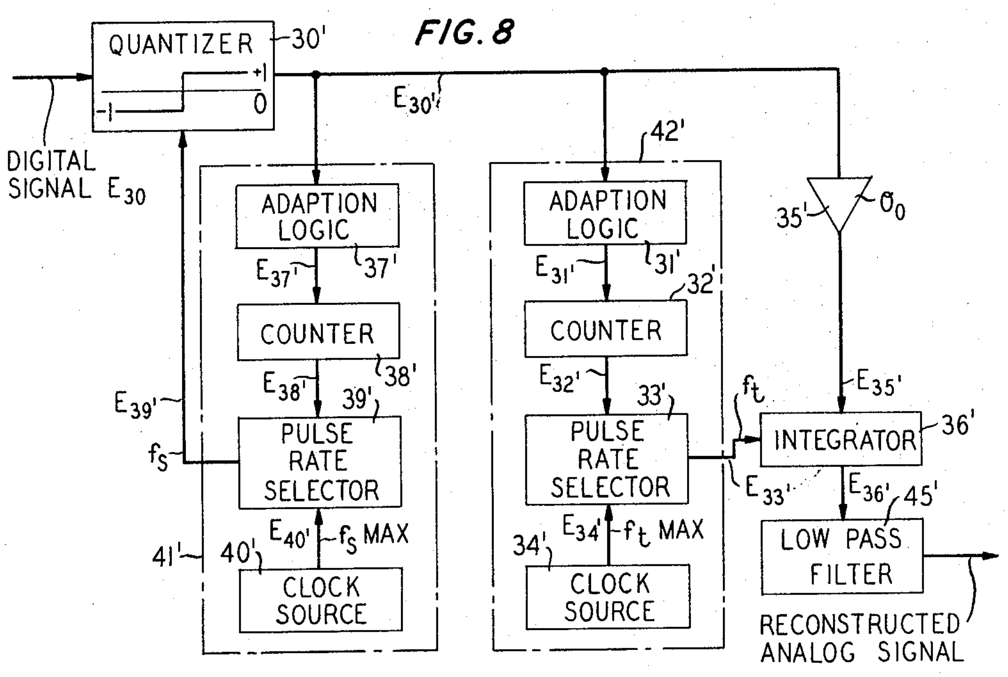

FIG. 8 is a diagram of a DADD according to the present invention which is associated with the DADM of FIG. 5. This DADD comprises quantizer 30', gain device 35', integrator 36', sampling pulse generator 41' operating at the rate $f_s$, programmable pulse generator 42' operating at the rate $f_t$, and low-pass filter 45'. As in FIG. 5, sampling pulse generator 41' and programmable pulse generator 42' each comprise adaption logic, a counter, pulse rate selectors respectively operating at the rates $f_s$ and $f_t$, and clock sources respectively operating at the rates $f_{s\ max}$ and $f_{t\ max}$. Again, the elements of this DADD, except for low-pass filter 45', are substantially the same and operate in substantially the same manner as corresponding elements of the associated DADM of FIG. 5. Finally, lowpass filter 45', which in this case provides the reconstructed analog signal, can be deleted under the proper conditions.

According to the present invention, the modulator and demodulator can be configured to provide both positive and negative steps during the sampling period $1/f_s$. For instance, let $k_+$ and $k_-$ be the number of positive and negative steps, respectively, of amplitude $\sigma_0$ exhibited by the integrator outputs. Therefore, the net change in each integrator output signal during a given sampling period is given by $\sigma_k = k\sigma_0 = |k_+ - k_-|\sigma_0$, where $k_+\sigma_0$ and $k_+\sigma_0$ are the overall positive and negative changes, respectively. Further, by letting $k_+$ and $k_-$ be subject to the constraint that their sum, i.e., $k_+ + k_-$ be equal to a constant, this constant advantageously being $f_{t\ max}/f_s$, there results the elimination of nonlinear distortion in the integrator output signals.

Also, the demodulator of the present invention could include a leakage resistor which connects the integrator output to a reference potential such as ground. This resistor provides a finite memory at the integrator output so that errors introduced during transmission will be forgotten.

While this invention for a discrete adaptive delta modulation system has been described in terms of specific illustrative embodiments, it will be apparent to those skilled in the art that many modifications are possible within the spirit and scope of the disclosed principle.

What is claimed is:

1. A delta modulating system wherein a delta modulated digital signal at the rate $f_s$ corresponds to an analog signal, a demodulator for said system comprising:

means for generating pulses at the rate $f_t$ greater than or equal to $f_s$, means for generating sampling pulses at the rate $f_s$ means jointly responsive to said digital signal and said sampling pulses at the rate $f_s$ for producing a retimed signal, and integrating means jointly responsive to said retimed signal and to said pulses at the rate $f_t$ for reconstructing said analog signal.

2. The demodulator of claim 1 wherein said retimed signal producing means is a two-level quantizer which at the rate $f_s$ emits a first output pulse when said digital signal is at one binary level and emits a second output pulse when said digital signal is at a second binary level.

3. The demodulator of claim 2 wherein said two-level quantizer is a flip-flop.

4. The demodulator of claim 1 wherein said means for generating pulses at the rate $f_t$ is responsive to said retimed signal.

5. The demodulator of claim 1 wherein said integrating means is a single stepsize analog integrator having the basic stepsize $\sigma_0$ and wherein amplitude changes $\sigma_k$ in said reconstructed analog signal during any sampling interval $1/f_s$ are given by the product of $\sigma_0$ and the number of pulses $k$ applied at the rate $f_t$ to said integrator.

6. The demodulator of claim 5 wherein said single stepsize analog integrator is a charge parcelling integrator.

7. The demodulator of claim 1 wherein said means for generating pulses at the rate $f_t$ is responsive to said means for generating sampling pulses at the rate $f_s$.

8. The demodulator of claim 5 wherein said means for generating pulses at the rate $f_t$ includes:
counting means,
adaption logic responsive to said digital signal for controlling the count of said counting means,
a clock source for generating pulses at the constant rate $f_{t\ max}$ greater than or equal to $f_t$, and
pulse rate selecting means jointly responsive to said clock source and said counting means for emitting at the rate $f_t$ said number of pulses $k$ numerically equal to the count of said counting means.

9. The demodulator of claim 8 wherein said pulse rate selecting means is a binary rate multiplier for producing during the sampling interval $1/f_s$ said $k$ pulses ranging in number from 1 to $f_{t\ max}/f_s$.

10. The demodulator of claim 8 wherein said counting means is a binary counter whose count varies from 1 to $f_{t\ max}/f_s$ in powers of 2.

11. The demodulator of claim 5
wherein said means for generating pulses at the rate $f_t$ includes:
counting means,
adaption logic for controlling the count of said counting means,
a clock source for generating pulses at the constant rate $f_{t\ max}$ greater than or equal to $f_t$, and
pulse rate selecting means jointly responsive to said clock source and said counting means for emitting at the rate $f_t$ said number of pulses $k$ numerically to the count of said counting means; and
wherein said demodulator further comprises:
means responsive to said clock source for generating pulses at the rate $f_s$, and
means jointly responsive to said digital signal and said sampling pulses at the rate $f_s$ for producing a retimed signal;
said adaption logic and said integrating means both being responsive to said retimed signal.

12. The demodulator of claim 1 wherein said means for generating sampling pulses at the rate $f_s$ is responsive to said retimed signal.

13. The demodulator of claim 12
wherein said integrating means is a single step-size analog integrator having the basic stepsize $\sigma_0$ and wherein amplitude changes $\sigma_k$ in said reconstructed analog signal during any sampling interval $1/f_s$ are given by the product $\sigma_0$ and the number of pulses $k$ applied at the rate $f_t$ to said integrator; and wherein said means for generating sampling pulses at the rate $f_s$ includes:
counting means,
adaption logic responsive to said retimed signal for controlling the count of said counting means,
a clock source for generating pulses at the constant rate $f_{s\ max}$ greater than or equal to $f_s$, and
pulse rate selecting means jointly controlled by said clock source and said counting means for emitting at the rate $f_s$ a plurality of pulses numerically equal to the count of said counting means.

* * * * *

UNITED STATES PATENT OFFICE
CERTIFICATE OF CORRECTION

Patent No. 3,815,033 Dated June 4, 1974

Inventor(s) Stuart Keene Tewksbury

It is certified that error appears in the above-identified patent and that said Letters Patent are hereby corrected as shown below:

The title [54] "Discrete Adaptive Delta Modulation System" should read -- Demodulator for Discrete Adaptive Delta Modulation System --. Column 1, line 48, "modulator" should be -- demodulator --. Column 5, line 15, "slop $|.E'_{in}(t)|$." should read -- slope $|E'_{in}(t)|$ --. Column 5, line 21, after "to" change ".$|E'_{in}(t).|$," to read -- $|E'_{in}(t)|$, --. Column 6, line 18, after "until" change ".$|E'_{in}(t).|$," to read -- $|E'_{in}(t)|$ --. Column 8, line 3, "$e_{20}$" should read -- $E_{20}$ --. Column 8, line 30, "$ff_s$" should read -- $f_s$ --. Column 10, line 37, 2nd occurrence, "$k_+\sigma_0$" should read -- $k_-\sigma_0$ --.

Signed and sealed this 29th day of October 1974.

(SEAL)
Attest:

McCOY M. GIBSON JR.
Attesting Officer

C. MARSHALL DANN
Commissioner of Patents